(12) United States Patent
Moren et al.

(10) Patent No.: US 8,551,577 B2
(45) Date of Patent: Oct. 8, 2013

(54) LAYERED PARTICLE ELECTROSTATIC DEPOSITION PROCESS FOR MAKING A COATED ABRASIVE ARTICLE

(75) Inventors: Louis S. Moren, Mahtomedi, MN (US); Brian G. Koethe, Cottage Grove, MN (US); Ernest L. Thurber, Somerset, WI (US)

(73) Assignee: 3M Innovative Properties Company, St. Paul, MN (US)

(*) Notice: Subject to any disclaimer, the term of this patent is extended or adjusted under 35 U.S.C. 154(b) by 566 days.

(21) Appl. No.: 12/786,622

(22) Filed: May 25, 2010

(65) Prior Publication Data

US 2011/0289854 A1 Dec. 1, 2011

(51) Int. Cl.
*B05D 1/06* (2006.01)
(52) U.S. Cl.
USPC ........... 427/482; 427/458; 427/472; 427/474; 427/475
(58) Field of Classification Search
USPC .................. 427/458, 472, 475, 474, 482
See application file for complete search history.

(56) References Cited

U.S. PATENT DOCUMENTS

| | | | |
|---|---|---|---|
| 2,370,636 A | 3/1945 | Carlton | |
| 4,138,229 A | 2/1979 | Tadokoro | |
| 5,078,753 A * | 1/1992 | Broberg et al. | 51/298 |
| 5,201,916 A | 4/1993 | Berg et al. | |
| 5,372,620 A | 12/1994 | Rowse et al. | |
| RE35,570 E | 7/1997 | Rowenhorst et al. | |
| 5,984,998 A | 11/1999 | Ottesen et al. | |
| 6,475,253 B2 | 11/2002 | Culler et al. | |
| 6,500,493 B2 | 12/2002 | Swei et al. | |
| 6,511,713 B2 | 1/2003 | Mathisen et al. | |
| 6,638,601 B1 * | 10/2003 | Follensbee | 428/143 |
| 2001/0002362 A1 | 5/2001 | Guiselin | |
| 2004/0209561 A1 | 10/2004 | Suzuki | |

FOREIGN PATENT DOCUMENTS

| | | | |
|---|---|---|---|
| GB | 398 907 | | 9/1933 |
| GB | 518 833 | | 3/1940 |
| GB | 523 813 | | 7/1940 |
| GB | 587473 | * | 8/1943 |
| GB | 587 473 | | 4/1947 |
| WO | WO 2010/002493 | | 1/2010 |

OTHER PUBLICATIONS

U.S. Appl. No. 12/337,075, entitled "Shaped Abrasive Particles with a Sloping Sidewall" filed Dec. 17, 2008.
U.S. Appl. No. 61/265,995 entitled Method of Making a Coated Abrasive Article Having Shaped Abrasive Particles and Resulting Product filed on Dec. 2, 2009.

* cited by examiner

*Primary Examiner* — Frederick Parker
(74) *Attorney, Agent, or Firm* — Scott A. Baum

(57) ABSTRACT

Disclosed is a method of applying particles to a coated backing. A first layer of particles is created over a second layer of particles on a support surface and the first layer of particles is different in at least one property from the second layer of particles. A coated backing is positioned above the first and second layer of particles. An electrostatic field is applied simultaneously to the first and second layer of particles such that the first layer of particles closer to the coated backing are preferentially attracted to the coated backing first before the second layer of particles.

17 Claims, 4 Drawing Sheets

LAYERED PARTICLE ELECTROSTATIC DEPOSITION PROCESS FOR MAKING A COATED ABRASIVE ARTICLE

BACKGROUND

The use of an electrostatic field to apply abrasive grains to a coated backing of an abrasive article is well known. For example, U.S. Pat. No. 2,370,636 issued to Minnesota Mining and Manufacturing Company in 1945 discloses the use of an electrostatic field for effecting the orientation of the abrasive grains such that each abrasive grain's elongated dimension is substantially erect (standing up) with respect to the backing surface.

SUMMARY

When using an electrostatic field to apply abrasive grains to a coated backing, the electrical charge taken on by the abrasive particle is proportional to its surface area. The smaller the abrasive particle, the greater will be its ratio of the surface area to its corresponding volume and weight. Thus, smaller abrasive particles will become more heavily charged per unit of weight than larger abrasive particles and smaller abrasive particles will respond more actively to the electrostatic field. Such a phenomenon is disclosed in GB Patent No. 398,907, and used to apply the smaller abrasive particles first to a coated backing prior to the larger abrasive particles in a blend of abrasive particles by drop coating the blended abrasive particles vertically through an electrostatic field as seen in FIG. 1 of GB 398,907.

However, sometimes it is more desirable to first apply the larger abrasive particles onto the coated backing, and then apply the smaller abrasive particles after application of the larger abrasive particles. This is especially helpful when the larger abrasive particles comprise shaped abrasive particles such as triangular shaped abrasive particles discussed in pending U.S. Provisional Patent Application No. 61/265,995 entitled "Method of Making A Coated Abrasive Article Having Shaped Abrasive Particles and Resulting Product." If the smaller abrasive particles or even filler particles are coated first, the triangular abrasive particles will often orientate "upside down" such the point or vertex of the triangular shaped abrasive particle is attached to the backing and the flat base of the triangle is present on the grinding surface. Flat bases of triangles are not as sharp as the points, and the resulting performance of the coated abrasive article is reduced when coating blends of particles or the smaller particles first.

A way to accomplish the desired abrasive particle coating order is to use separate abrasive particle feeders and separate electrostatic fields to sequentially apply the larger abrasive grain first to the coated backing, and then to apply the smaller abrasive grain or fillers after the first abrasive grain has already been electrostatically coated onto the backing However, such a method often requires reconfiguring existing production lines to add the additional equipment necessary. Often, there is either inadequate space to add the equipment or insufficient capital dollars in the budget for such improvements. Therefore, what is needed is a method to apply two different abrasive grains or particles onto a coated backing in a desirable order that requires minimal additional equipment or space. What is also needed is a way to nearly simultaneously apply two different abrasive grains or particles such that the abrasive grains tend to stand up relative to the backing layer.

The inventors have determined that the above needs and others can be achieved by positioning the abrasive grain or particles on the conveyor belt in two or more distinct layers. When the conveyor belt with the particles in distinct layers moves through the electrostatic field, the first abrasive grain layer nearer to the ground plate in the electrostatic field is first removed from the conveyor belt and then the second abrasive grain layer initially placed onto the conveyor belt and covered by the first abrasive grain layer is removed. Using such a method, the particle size effect in an electrostatic field can be overcome by proper layering of the particles. If the larger particles are layered over the top of the smaller particles, the smaller particles cannot be preferentially picked up by the electrostatic field until after the larger particles covering them have been lifted off of the conveyor belt by the electrostatic field. The preferential motion of the particles due to physics in an electrostatic field can be reversed simply by smothering the smaller particles under the larger ones to prevent the smaller particles from being the first particles lifted off of the conveyor belt by the electrostatic field.

Hence, in one embodiment, the invention resides in a method of applying particles to a coated backing comprising: creating a first layer of particles over a second layer of particles on a support surface, wherein the first layer of particles is different in at least one property from the second layer of particles; positioning the coated backing above the first and second layer of particles; and applying an electrostatic field simultaneously to the first and second layer of particles wherein the first layer of particles closer to the coated backing are preferentially attracted to the coated backing first before the second layer of particles.

In another embodiment, the invention resides in a method comprising: moving a coated backing though an electrostatic field above a conveyor belt; moving a first layer of particles positioned on a second layer of particles sitting on the conveyor belt through an electrostatic field; and wherein the first layer of particles is different in at least one property from the second layer of particles.

In another embodiment, the invention resides in a system comprising: a conveyor belt moving though an electrostatic field; a coater applying a make coating onto a backing; a web path guiding a coated backing through the electrostatic field above the conveyor belt and the make coat on the backing is positioned facing the conveyor belt; a first particle feeder applying a first particle layer over a second particle layer on the conveyor belt; a second particle feeder applying the second particle layer onto the conveyor belt located before the first particle feeder with regard to the conveyer belt's direction of travel; and wherein the conveyor belt moves the first particle layer and the second particle layer though the electrostatic field transferring at least some of the first and second particles to the coated backing from the conveyor belt.

BRIEF DESCRIPTION OF THE DRAWINGS

It is to be understood by one of ordinary skill in the art that the present discussion is a description of exemplary embodiments only, and is not intended as limiting the broader aspects of the present disclosure, which broader aspects are embodied in the exemplary construction.

Repeated use of reference characters in the specification and drawings is intended to represent the same or analogous features or elements of the disclosure.

Figure 1:
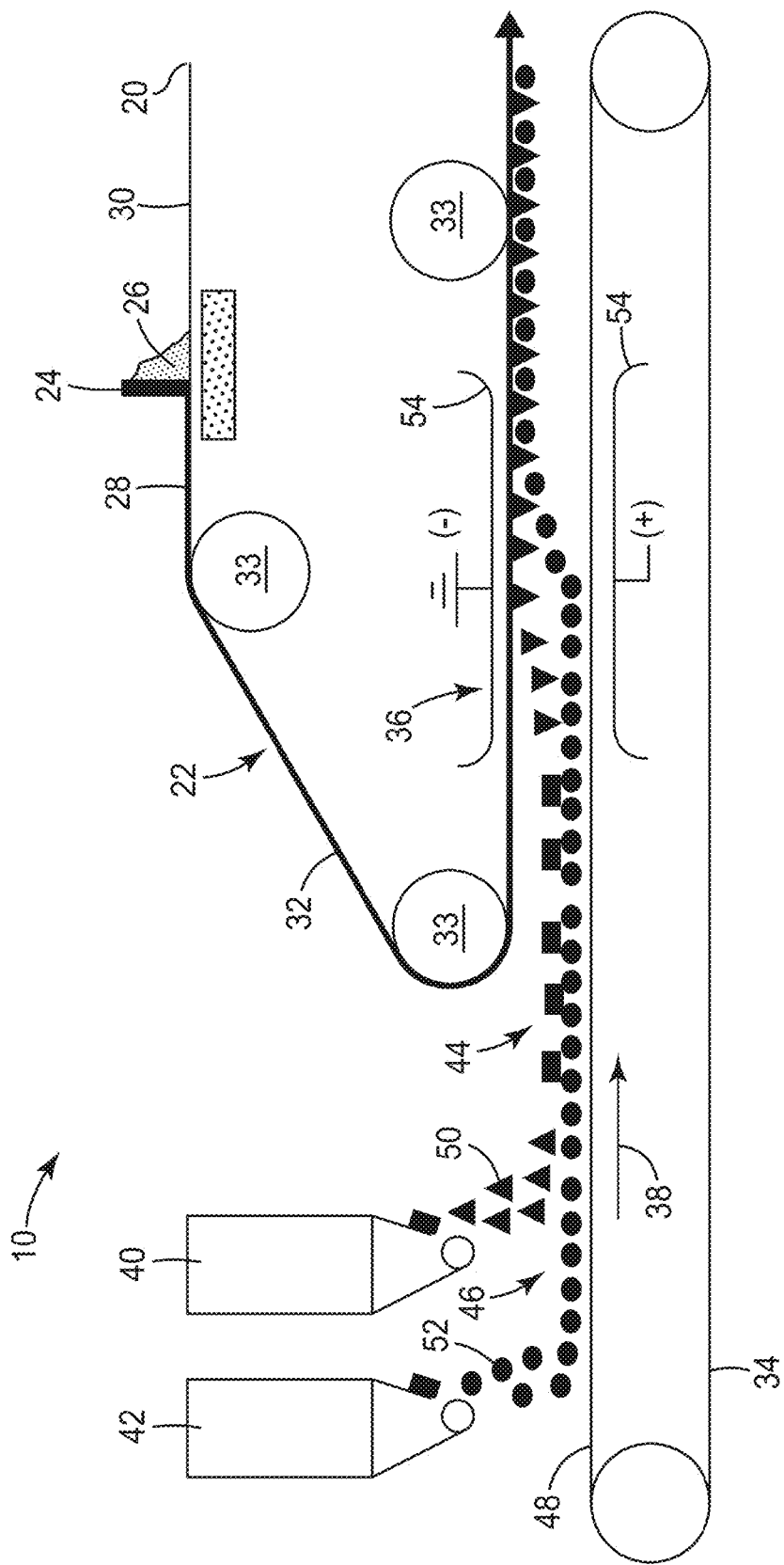
FIG. 1 illustrates a portion of a coated abrasive maker.

Repeated use of reference characters in the specification and drawings is intended to represent the same or analogous features or elements of the disclosure.

DEFINITIONS

As used herein, forms of the words "comprise", "have", and "include" are legally equivalent and open-ended. Therefore, additional non-recited elements, functions, steps or limitations may be present in addition to the recited elements, functions, steps, or limitations.

As used herein "formed abrasive particle" means an abrasive particle having at least a partially replicated shape. Non-limiting processes to make formed abrasive particles include shaping the precursor abrasive particle in a mold having a predetermined shape, extruding the precursor abrasive particle through an orifice having a predetermined shape, printing the precursor abrasive particle though an opening in a printing screen having a predetermined shape, or embossing the precursor abrasive particle into a predetermined shape or pattern. Non-limiting examples of formed abrasive particles include shaped abrasive particles as disclosed in U.S. Pat. Nos. RE 35,570; 5,201,916; and 5,984,998; or elongated ceramic rods/filaments often having a circular cross section produced by Saint-Gobain Abrasives an example of which is disclosed in U.S. Pat. No. 5,372,620; or shaped abrasive composites comprising a binder and plurality of abrasive particles formed into a shape such as a pyramid.

As used herein, "a first layer of particles and a second layer of particles" means that two different materials having at least one different property are sequentially applied to a support surface to form the first and second layers of particles. A layer of particles need not be continuous, uniform, or perfectly segregate into distinct bands of the two different materials; although, in some embodiments, the layers can be uniform and/or segregate into distinct bands.

DETAILED DESCRIPTION

Referring now to FIG. 1, a portion of a coated abrasive maker 10 is illustrated. A backing 20 is advanced along a web path 22 past a coater 24 which applies a resin 26 forming a make coat 28 on a first major surface 30 of the backing thereby creating a coated backing 32. The coated backing 32 is guided along the web path 22 by appropriate guide rolls 33 such that the coated backing is positioned above and generally parallel to a conveyor belt 34 with the make coat 28 on the backing 20 facing the conveyor belt. Located prior to an electrostatic field generating apparatus 36, with respect to the conveyor belt's direction of travel 38, a first particle feeder 40 and a second particle feeder 42 apply a first particle layer 44 and a second particle layer 46 onto a support surface 48 of the conveyor belt. The second particle feeder 42 is located before the first particle feeder 40 with respect to the conveyor belt's direction of travel 38. The first particle feeder 40 applies the first particle layer 44 over the second particle layer 46 on the conveyor belt 34. After application of the particle layers, the conveyor belt 34 moves the first and the second particle layers through an electrostatic field created by the electrostatic field generating apparatus 36. The coated backing 32 is also guided by the web path 22 through the electrostatic field above the conveyor belt.

Thereafter, due to electrostatic attraction, at least some of the first particles 50 in the first particle layer 44 are picked up off of the conveyor belt 34 and become attached to the coated backing 32. Similarly, at least some of the second particles 52 in the second particle layer 46 are picked up off of the support surface 48 of the conveyor belt 34 and become attached to the coated backing 32. The first particles 50 in the first layer of particles 44 are preferentially applied first to the coated backing 32 prior to the second particles 52 in the second layer of particles 46 by the electrostatic field. Even though the first particles 50 may be heavier or larger than the second particles 52, they tend to be the first particles to attach to the coated backing. It is believed that this result occurs because the first particles 50 in the first layer of particles 44 are located closer to the coated backing 32, and because the second particles 52 that are supported by the support surface 48 underneath at least some of the first particles 50 cannot be lifted off of the support surface by the electrostatic field until after the first particle 50 above them has moved out of the way.

Layering the particles on the conveyor belt 34 to nearly simultaneously apply them to the coated backing in a preferential order is useful when the first layer of particles is different in at least one property from the second layer of particles. Non-limiting examples of differences in properties can be: the size of the particles, the shape of the particles, the chemical composition of the particles, the electrostatic attraction of the particles, the surface treatment of the particles such as treatments to enhance electrostatic attraction of the particles, the density of the particles, the hardness of the particles, the color of the particles, the fracture toughness of the particles, or the weight ratios of the individual particles comprising a blend of particles such that the ratio of particles in the first and second layers is different.

In one embodiment, illustrated in FIG. 1, the first particles 50 comprise a different size and shape from the second particles 52. The first particles 50 comprise a majority of formed abrasive particles by weight and in one embodiment 100% by weight formed abrasive particles. The formed abrasive particles comprised shaped abrasive particles of alpha alumina formed into an equilateral triangular shape, such as a truncated triangular pyramid similar to FIG. 2, having a larger average size of approximately 1.5 mm long on each side of the larger triangular face, approximately 0.3 mm thick, and having about a 92 degree included angle for the slope of the edges. The second particles 52 comprise a majority of crushed alpha alumina abrasive particles by weight and in one embodiment 100% by weight crushed alpha alumina abrasive particles having a smaller average size within the specification limits of ANSI grade 60 and having a random, irregular, rounded or blocky shape as a result of the comminution process.

After the second particle feeder 42 applies the crushed ANSI grade 60 particles in a second particle layer 46, the triangular first particles 50 are applied over the second particles 52. The triangular first particles after landing on the support surface tend to lie flat on the conveyor belt appearing in an end view as a rectangle covering one or more of the second particles 52 since the first particles are much thinner than the height or width of the particles and resemble flat, triangular plates. Thereafter, the first and second particles are applied nearly simultaneously in sequential preferential order to the coated backing as discussed above. The triangular abrasive particles tend to attach first by the base of the triangle to the coated backing, and the crushed abrasive particles fill in the interstices between the triangular abrasive particles.

In some embodiments, the first layer of particles comprises a first average size and the second layer of particles comprises a second average size, and a ratio of the first average size divided by the second average size is between about 2 to about 10, or between about 1.5 to about 15, or between about 1.25 to about 25, or between about 1 to about 30. All other factors being equal, it is believed that a larger difference in the average size between the particles in the two layers promotes better sequencing of the particles as they attach to the coated backing since a significantly larger first particle 50 is more likely to cover one or more smaller second particles 52.

In another embodiment, the first and second particles can have approximately the same size and shape but have a different chemical composition. For example, two randomly crushed abrasive grains having the same ANSI grade could be employed such as ceramic alpha alumna abrasive grains and fused aluminum oxide abrasive grains. In a specific embodiment, the first layer of particles can comprise a majority of ceramic alpha alumina particles by weight to preferentially sequence them first to the coated backing. In another embodiment, the first layer of particles can comprise 90-100 percent by weight ceramic alpha alumina particles. The second layer of particles can comprise another type of abrasive grain, filler particles, or a combination of abrasive grain and filler particles. Preferential sequencing of the particles having approximately the same size but different densities can be done by appropriately layering the particles in the desired order on the conveyer belt.

In another embodiment, one of the first layer of particles or the second layer of particles can comprise a majority of filler particles by weight and the other layer of particles can comprise a majority of abrasive particles by weight. Typically, the first layer of particles 44 would comprise the abrasive particles such that they are applied first and then the remaining areas of the coated backing would be coated with the filler particles in the second layer of particles.

In another embodiment, different blends of particles in two or more layers can be applied in sequential order. For example, the first layer of particles 44 could comprise a blend of abrasive particles and grinding aid particles that is placed into the first particle feeder 40. The second layer of particles 46 could comprise a blend of the same abrasive particles and grinding aid particles, but have a different ratio of the individual particle weights that is placed into the second particle feeder 42. In a specific embodiment, less grinding aid particles by weight are present in the second layer of particles 46 than in the first layer of particles 44 such that more grinding aid particles are present closer to the backing in the resulting abrasive layer and less grinding aid particles are present further from the backing towards the exterior surface of the abrasive layer thereby maximizing placement and use of the grinding aid as the abrasive layer wears away and becomes duller.

Useful abrasive particles include fused aluminum oxide based materials such as aluminum oxide, ceramic aluminum oxide (which may include one or more metal oxide modifiers and/or seeding or nucleating agents), and heat-treated aluminum oxide, silicon carbide, co-fused alumina-zirconia, diamond, ceria, titanium diboride, cubic boron nitride, boron carbide, garnet, flint, emery, ceramic alpha alumina sol-gel derived abrasive particles, and blends thereof. The abrasive particles may be in the form of, for example, individual particles, agglomerates, abrasive composite particles, and mixtures thereof.

Figure 2:
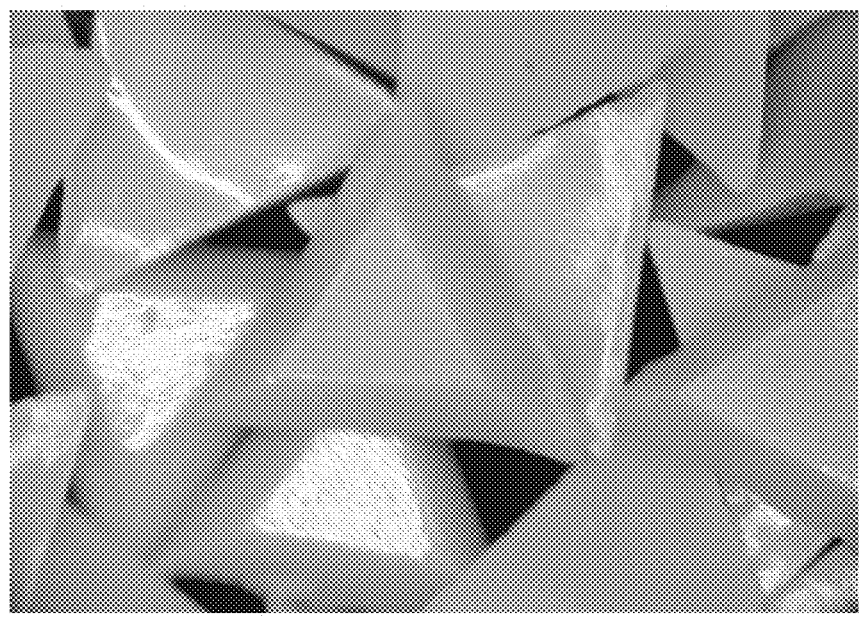
FIG. 2 illustrates triangular shaped abrasive particles.

Referring now to FIG. 2, exemplary shaped abrasive particles are shown. The shaped abrasive particles are molded into a generally triangular shape during manufacturing. In specific embodiments, the shaped abrasive particles can comprise triangular prisms (90 degree or straight edges) or truncated triangular pyramids (sloping edges as shown). In many embodiments, the faces of the shaped abrasive particles comprise equilateral triangles.

The abrasive particles are typically selected to correspond to abrasives industry accepted nominal grades such as, for example, the American National Standards Institute, Inc. (ANSI) standards, Federation of European Producers of Abrasive Products (FEPA) standards, and Japanese Industrial Standard (JIS) standards. Exemplary ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. Exemplary FEPA grade designations include: P8, P12, P16, P24, P36, P40, P50, P60, P80, P100, P120, P180, P220, P320, P400, P500, 600, P800, P1000, and P1200. Exemplary JIS grade designations include: JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS400, JIS600, JIS800, JIS1000, JIS1500, JIS2500, JIS4000, JIS6000, JIS8000, and JIS10,000.

Useful filler particles include silica such as quartz, glass beads, glass bubbles and glass fibers; silicates such as talc, clays (e.g., montmorillonite), feldspar, mica, calcium silicate, calcium metasilicate, sodium aluminosilicate, sodium silicate; metal sulfates such as calcium sulfate, barium sulfate, sodium sulfate, aluminum sodium sulfate, aluminum sulfate; gypsum; vermiculite; wood flour; aluminum trihydrate; carbon black; aluminum oxide; titanium dioxide; cryolite; chiolite; and metal sulfites such as calcium sulfite.

Exemplary grinding aids, which may be organic or inorganic, include waxes, halogenated organic compounds such as chlorinated waxes like tetrachloronaphthalene, pentachloronaphthalene, and polyvinyl chloride; halide salts such as sodium chloride, potassium cryolite, sodium cryolite, ammonium cryolite, potassium tetrafluoroborate, sodium tetrafluoroborate, silicon fluorides, potassium chloride, magnesium chloride; and metals and their alloys such as tin, lead, bismuth, cobalt, antimony, cadmium, iron, and titanium; and the like. Examples of other grinding aids include sulfur, organic sulfur compounds, graphite, and metallic sulfides. A combination of different grinding aids can be used. The grinding aid may be formed into particles or particles having a specific shape as disclosed in U.S. Pat. No. 6,475,253.

Suitable backings include, for example, those known in the art for making coated abrasive articles. Typically, the backing has two opposed major surfaces. The thickness of the backing generally ranges from about 0.02 to about 5 millimeters, or from about 0.05 to about 2.5 millimeters, or from about 0.1 to about 0.4 millimeter, although thicknesses outside of these ranges may also be useful. Exemplary backings include nonwoven fabrics (e.g., including needletacked, meltspun, spunbonded, hydroentangled, or meltblown nonwoven fabrics), knitted, stitchbonded, and woven fabrics; scrim; combinations of two or more of these materials; and treated versions thereof.

Useful particle feeders (40, 42) for use in the apparatus include any feeder capable of applying particles to the conveyor belt or support surface such as: hoppers, drop coaters, vibratory feeders, knife coaters, belt feeders, gravimetric feeders (loss weight feeders) and volumetric feeders.

Suitable coaters 24 for use in the apparatus include any coater capable of applying a make coat layer onto a backing such as: knife coaters, air knife coaters, gravure coaters, reverse roll coaters, metering rod coaters, extrusion die coaters, spray coaters and dip coaters.

The make coat 28 can be formed by coating a curable make layer precursor onto a major surface of the backing. The make layer precursor may comprise, for example, glue, phenolic resin, aminoplast resin, urea-formaldehyde resin, melamine-formaldehyde resin, urethane resin, free-radically polymerizable polyfunctional (meth)acrylate (e.g., aminoplast resin having pendant alpha, beta-unsaturated groups, acrylated urethane, acrylated epoxy, acrylated isocyanurate), epoxy resin (including bis-maleimide and fluorene-modified epoxy resins), isocyanurate resin, and mixtures thereof.

Useful conveyor belts 34 for use with the apparatus comprise any conveyor belt made from a non-metallic material such as paper belts, fabric belts, polyvinyl chloride belts, nylon belts, polyurethane belts, polyester belts, or rubber belts. In some embodiments, the conveyor belt and the coated backing are substantially horizontal and parallel as they both move through the electrostatic field. However, it is not necessary that the coated backing and conveyor belt are each horizontal or that they are parallel to each other in the electrostatic field. The conveyor belt and/or the coated backing may be traveling in an inclined or declined path relative to horizontal, and converging or diverging with respect to each other or combinations thereof. The conveyor belt and the coated backing may both be traveling in the same direction (co-current application) or in opposite directions (counter-current application).

An example of a useful electrostatic field generating apparatus 36 includes electrodes 54 having an electrical potential applied between them with one electrode placed above the coated backing 32 and the opposing electrode placed below the conveyor belt 34. The electrical potential can be supplied by a suitable A.C. or D.C. power supply. Electrodes having a shape to apply the abrasive grain in a pattern may be employed as disclosed U.S. Pat. No. 6,511,713.

In other embodiments of the invention, the first and second particle layers can be created on a non-moving support surface for making small quantities of coated abrasive articles in a batch mode as opposed to a continuous mode. More than two layers of particles can be placed onto the support surface or the conveyor belt such as three, four, or even more layers to nearly simultaneously, sequentially apply the particles onto the coated backing.

EXAMPLES

Objects and advantages of this invention are further illustrated by the following non-limiting examples; however, the particular materials and amounts thereof recited in these examples, as well as other conditions and details, should not be construed to unduly limit this invention. Unless otherwise noted, all parts, percentages, ratios, etc. in the Examples and the rest of the specification are by weight.
Materials

TABLE 1

| Identifier | Description |
| --- | --- |
| AP1 | shaped alpha alumina abrasive particles produced from a mold having triangular shaped mold cavities of 28 mils depth (0.71 mm) and 110 mils (2.79 mm) on each side, producing triangular shaped abrasive particles |

TABLE 1-continued

| Identifier | Description |
| --- | --- |
| | approximately 1.5 mm long on each side of the larger triangular face, approximately 0.3 mm thick, having about a 92 degree included angle for the slope of the edges, approximately grade 36+, and disclosed in pending U.S. patent application No. 12/337,075 filed 17 Dec. 2008 |
| AP2 | alpha alumina abrasive particles, ANSI grade 60, obtained as "ALODUR BFRPL" from Treibacher Schleifmittel GmbH, Villach, Austria |
| AP3 | alpha alumina abrasive particles, grade 36, obtained as "CUBITRON 321" from 3M, Saint Paul, Minnesota |
| MC | make coating, a composition of PR1 filled with about 40 to 50 percent by weight of FIL1 and diluted to 80-85% solids with water |
| Backing | Y-weight polyester sateen weave fabric, 331 grams/sq. meter, obtained from Milliken & Company, LaGrange, Georgia with conventional, abrasive cloth treatments |
| PR1 | Resole phenol-formaldehyde resin (75 wt % in water), a 1.5:1 to 2.1:1 (phenol:formaldehyde) condensate catalyzed by 1 to 5% metal hydroxide |
| FIL1 | Calcium silicate obtained as Wollastocoat 400 from Nyco Minerals Inc., Willsboro, N.Y. |

Examples 1-4

Examples 1-4 show the effect of reversing the two layers of abrasive particles electrostatically applied onto a coated backing Examples 1-4 were prepared using a laboratory-scale electrostatic coating apparatus having a backing unwind and rewind, a knife coater to apply a make coating composition to the backing, a particle supply conveyor belt, and a humidity-controlled electrostatic coating chamber. The particle supply conveyor belt system was modified to include two particle feeder positions comprising vibratory feeders such that two distinct layers of abrasive particles could be deposited onto the particle conveyor belt, one on top of the other, at independently-controlled rates. For each example, the Backing was threaded through the apparatus from the unwind position to the rewind position. MC was applied to the backing via the knife coater. The particle supply belt was activated to a pre-determined speed with the first abrasive particles supplied to the first vibratory feeder and the second abrasive particles supplied to the second vibratory feeder. The first and second particle feeders were activated to deposit two distinct layers, one on top of the other, of abrasive particles on to the particle supply belt with the particle supply belt delivering the two layers of particles simultaneously to the electrostatic coater. The resulting abrasive-coated backing was further processed by conventional means to form coated abrasive articles. The abrasive layers of the abrasive articles were visually compared and photographically documented in FIGS. 3-6.

TABLE 2

| Description | Example 1 | Example 2 | Example 3 | Example 4 |
| --- | --- | --- | --- | --- |
| MC weight, grains/ 24 in$^2$ (g/m$^2$) | 52 (218) | 52 (218) | 50 (210) | 50 (210) |
| Line speed, ft/min (m/min) | 10.2 (3.1) | 10.2 (3.1) | 10.2 (3.1) | 10.2 (3.1) |
| Particle belt speed, ft/min (m/min) | 6.5 (2.0) | 6.5 (2.0) | 6.5 (2.0) | 6.5 (2.0) |
| Second particle layer (bottom) composition | AP1 | AP2 | AP3 | AP2 |
| Second particle layer (bottom) feed rate (g/min) | 213 | 90 | 197 | 165 |

TABLE 2-continued

Figure 3:
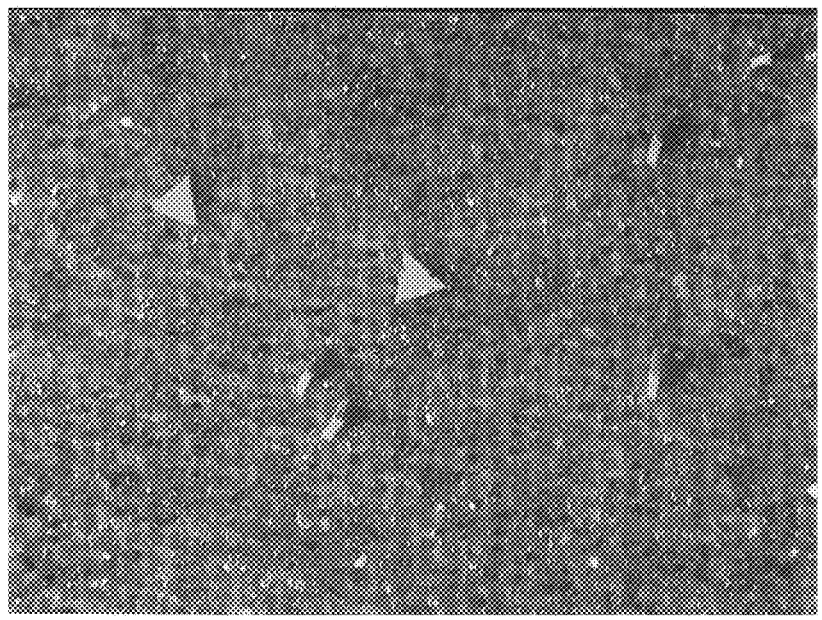
FIG. 3 is a photograph of the abrasive layer made by Example 1.
Figure 4:
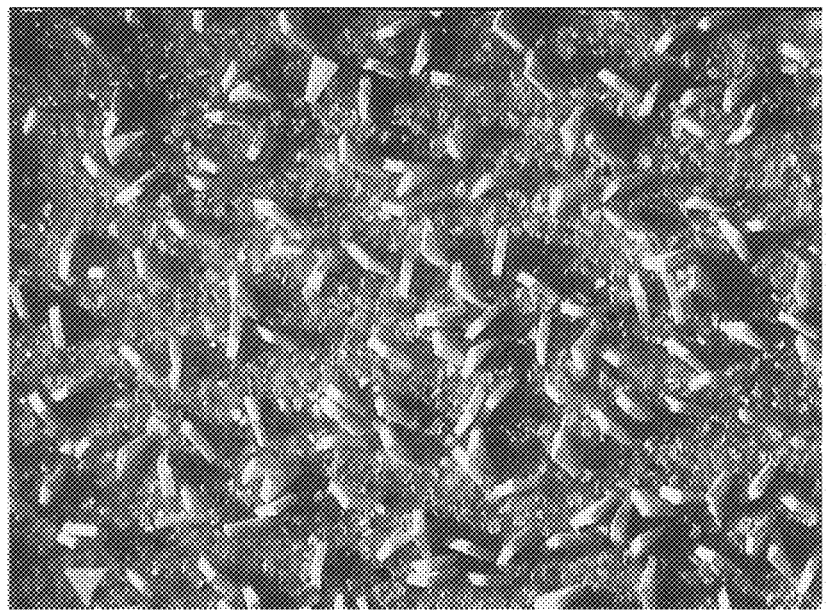
FIG. 4 is a photograph of the abrasive layer made by Example 2.
Figure 5:
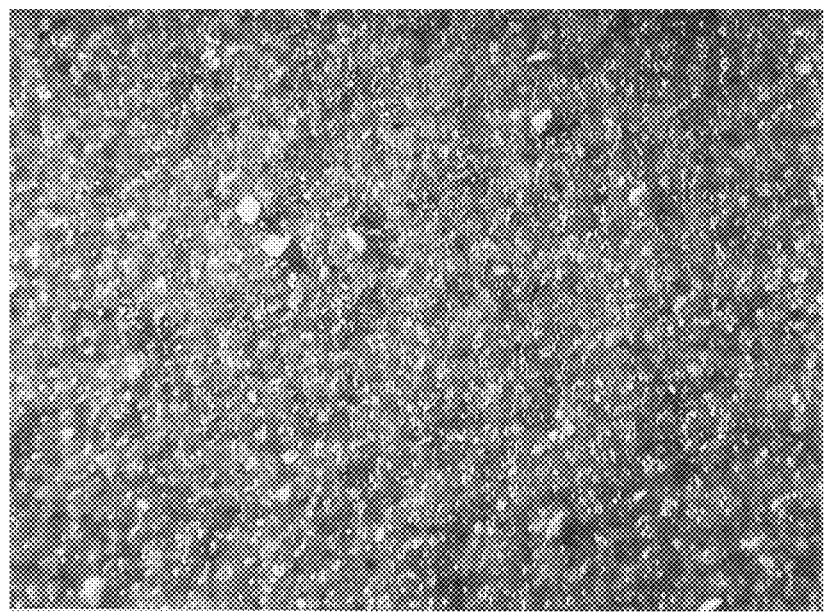
FIG. 5 is a photograph of the abrasive layer made by Example 3.
Figure 6:
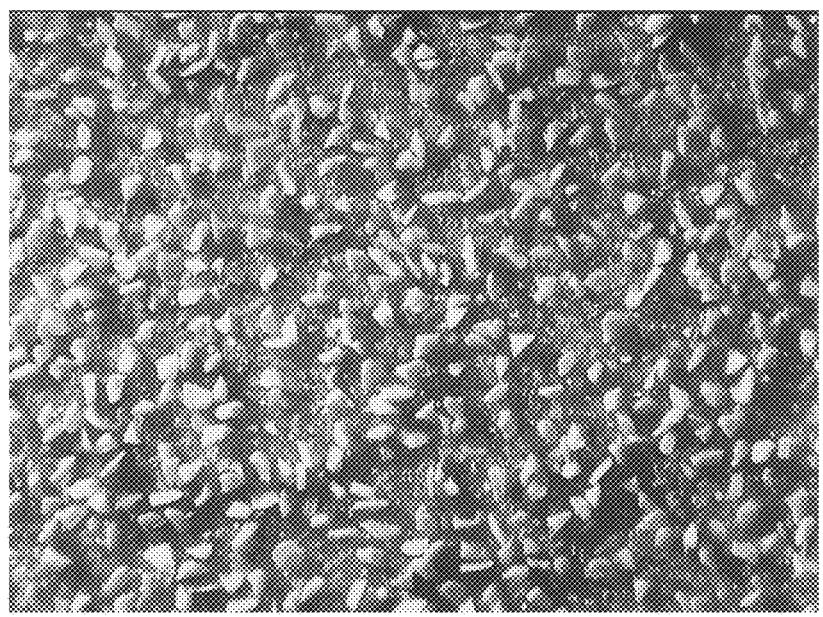
FIG. 6 is a photograph of the abrasive layer made by Example 4.

| Description | Example 1 | Example 2 | Example 3 | Example 4 |
| --- | --- | --- | --- | --- |
| First particle layer (top) composition | AP2 | AP1 | AP2 | AP3 |
| First particle layer (top) feed rate (g/min) | 89 | 210 | 159 | 196 |
| Current | DC | DC | DC | DC |
| Voltage (kV) | 40 | 42 | 35 | 35 |
| % RH in e-coater chamber | 55 | 50 | 55 | 55 |
| Results shown in: | FIG. 3 | FIG. 4 | FIG. 5 | FIG. 6 |

As seen in FIG. 3, when the smaller crushed abrasive particles comprise the first layer of particles 44, very few of the larger triangular abrasive particles from the second layer of particles 46 attach to the coated backing and some of the few that do tend to lie flat. In comparison as seen in FIG. 4, when the larger triangular abrasive particles comprise the first layer of particles 44, they are erectly applied to the coated backing and the smaller crushed abrasive particles from the second layer of particles 46 fill in the interstices between the larger abrasive particles on the coated backing. As seen in FIG. 5, when the smaller crushed abrasive particles comprise the first layer of particles 44, very few of the larger crushed abrasive particles from the second layer of particles 46 attach to the coated backing. In comparison, as seen in FIG. 6 when the larger crushed abrasive particles comprise the first layer of particles 44, they are erectly applied to the coated backing and the smaller crushed abrasive particles from the second layer of particles 46 fill in the interstices between the larger abrasive particles on the coated backing.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A method of applying particles to a coated backing comprising:
    creating a first layer of particles over a second layer of particles on a support surface, wherein in the first layer of particles the first particles are different in at least one property from the second particles in the second layer of particles;
    positioning the coated backing spaced apart and above the first and second layer of particles; and
    applying an electrostatic field simultaneously to the first and second layer of particles wherein, due to electrostatic attraction at least some of the first and second particles are picked up off the support surface, and the first layer of particles closer to the coated backing are preferentially attracted to the coated backing first before the second layer of particles.

2. The method of claim 1 wherein the first layer of particles and the second layers of particles each comprise abrasive particles and the first layer of particles are larger in average size than the second layer of particles weight to create the difference in at least one property.

3. The method of claim 1 wherein one of the first layer of particles or the second layer of particles comprises a majority of filler particles by weight and the other layer of particles comprises a majority of abrasive particles by weight to create the difference in at least one property.

4. The method of claim 1 wherein the first layer of particles comprises a first average size and the second layer of particles comprises a second average size and a ratio of the first average size divided by the second average size is between about 1.5 to about 15 to create the difference in at least one property.

5. The method of claim 1 wherein the first layer of particles comprises a majority of ceramic alpha alumina abrasive particles by weight to create the difference in at least one property.

6. The method of claim 1 wherein the first layer of particles comprises a majority of formed abrasive particles by weight having a predetermined shape and the second layer of particles comprises a majority of crushed abrasive particles by weight to create the difference in at least one property.

7. The method of claim 6 wherein the formed abrasive particles comprise a triangular prism or truncated triangular pyramid.

8. A method comprising:
    moving a coated backing though an electrostatic field above a conveyor belt; and
    moving a first layer of particles positioned on a second layer of particles sitting on the conveyor belt through the electrostatic field; and
    wherein in the first layer of particles the first particles are different in at least one property from the second particles in the second layer of particles wherein the conveyor belt moves the first particle layer and the second particle layer through the electrostatic field transferring at least some of the first and second particles to the coated backing from the conveyor belt.

9. The method of claim 8 wherein the first layer of particles and the second layer of particles each comprise abrasive particles and the first layer of particles are larger in average size than the second layer of particles to create the difference in at least one property.

10. The method of claim 8 wherein one of the first layer of particles or the second layer of particles comprises a majority of filler particles by weight and the other layer of particles comprises a majority of abrasive particles by weight to create the difference in at least one property.

11. The method of claim 8 wherein the first layer of particles comprises a first average size and the second layer of particles comprises a second average size and a ratio of the first average size divided by the second average size is between about 1.5 to about 15 to create the difference in at least one property.

12. The method of claim 8 wherein the first layer of particles comprises a majority of ceramic alpha alumina abrasive particles by weight to create the difference in at least one property.

13. The method of claim 8 wherein the first layer of particles comprises a majority of formed abrasive particles by weight having a predetermined shape and the second layer of particles comprises a majority of crushed abrasive particles by weight to create the difference in at least one property.

14. The method of claim 13 wherein the formed abrasive particles comprise a triangular prism or truncated triangular pyramid.

15. The method of claim 8 wherein due to electrostatic attraction at least some of the first and the second particles are picked up off the conveyor belt and become attached to the coated backing and the first particles are preferentially applied first to the coated backing.

16. The method of claim 9 wherein due to electrostatic attraction at least some of the first and the second particles are picked up off the conveyor belt and become attached to the coated backing and the first particles are preferentially applied first to the coated backing.

17. The method of claim 13 wherein due to electrostatic attraction at least some of the first and the second particles are picked up off the conveyor belt and become attached to the coated backing and the first particles are preferentially applied first to the coated backing.

* * * * *

UNITED STATES PATENT AND TRADEMARK OFFICE
CERTIFICATE OF CORRECTION

PATENT NO. : 8,551,577 B2  
APPLICATION NO. : 12/786622  
DATED : October 8, 2013  
INVENTOR(S) : Louis Stanley Moren Page 1 of 1

It is certified that error appears in the above-identified patent and that said Letters Patent is hereby corrected as shown below:

In the Specification

Column 1  
Line 56, delete "backing" and insert -- backing. --, therefor.

Column 2  
Line 33, delete "though" and insert -- through --, therefor.  
Line 40, delete "though" and insert -- through --, therefor.  
Line 50, delete "though" and insert -- through --, therefor.

Column 3  
Line 25, delete "though" and insert -- through --, therefor.

Column 6  
Line 21, delete "600," and insert -- P600, --, therefor.

Column 8  
Line 29, delete "backing" and insert -- backing. --, therefor.

In the Claims

Column 10  
Line 30, in Claim 8, delete "though" and insert -- through --, therefor.

Signed and Sealed this  
Thirty-first Day of December, 2013

Margaret A. Focarino  
*Commissioner for Patents of the United States Patent and Trademark Office*